UNITED STATES PATENT OFFICE.

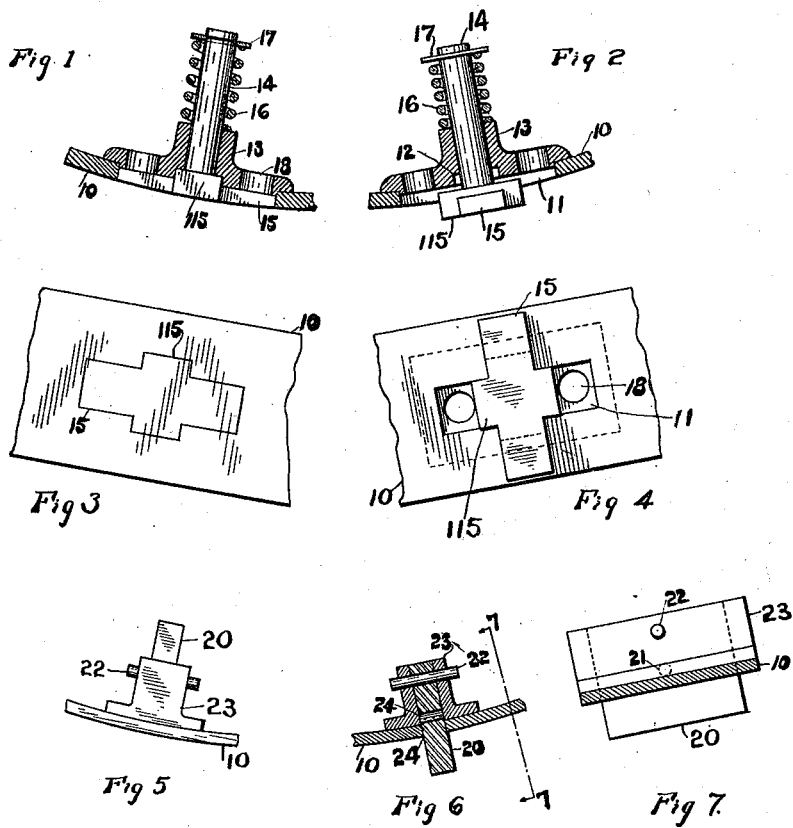

FRANK I. REMY, BENJAMIN P. REMY, AND ARTHUR BERGER, OF ANDERSON, INDIANA, ASSIGNORS TO REMY BROTHERS COMPANY, OF ANDERSON, INDIANA, A COPARTNERSHIP.

TRACTION-WHEEL CLEAT.

1,140,067. Specification of Letters Patent. Patented May 18, 1915.

Application filed December 9, 1912. Serial No. 735,739.

*To all whom it may concern:*

Be it known that we, FRANK I. REMY, BENJAMIN P. REMY, and ARTHUR BERGER, citizens of the United States, and residents of Anderson, county of Madison, and State of Indiana, have invented a certain new and useful Traction-Wheel Cleat; and we do hereby declare that the following is a full, clear, and exact description thereof, reference being had to the accompanying drawings, in which like letters refer to like parts.

The object of this invention is to provide an improved form and construction of cleat for a tractor wheel which, when there is no need of a cleat, does not project beyond the periphery or rim of the wheel, but when there is need of a cleat, it can be readily altered in position so as to project beyond the periphery or rim of the wheel.

The nature of the invention will be understood from the accompanying drawings and the following description and claims.

In the drawings, Figure 1 is a central vertical section through the lower part of a tractor wheel, the major portion of the wheel being broken away and showing the cleat mounted in the wheel in idle position. Fig. 2 is the same showing the cleat in position for service. Fig. 3 is a bottom view of a portion of the wheel and in the condition shown in Fig. 1. Fig. 4 is a similar view of Fig. 2. Fig. 5 is a side elevation of a portion of the wheel rim showing a modified form of the cleat construction. Fig. 6 is a longitudinal central section through what is shown in Fig. 5, with the cleat changed to its outer position. Fig. 7 is a transverse section through the wheel rim on the line 7—7 of Fig. 6.

In the drawings the part marked 10 is a portion of the rim of a tractor wheel, the same being a flat metal rim relatively wide and thin. The spokes, hub and other parts of the wheel are omitted. At intervals throughout the circumference of the wheel the rim is provided with the recesses 11 in the external surface thereof. Said recesses may be formed, if desired, by making an opening entirely through the rim and securing bearing brackets to the inner surface of the rim of the wheel and covering the opening, or said bearing brackets and wheel rim may be integral, as the mode of securing these parts is immaterial to this invention. The recesses 11 extend circumferentially or longitudinally of the rim and midway thereof there is another and deeper recess 12 extending transversely of the rim and of the same width as the recess 11 and extending into a bearing bracket 13.

The bearing bracket has a central boss extending radially inward from the rim of the wheel to furnish bearing for a rod or shank 14 to the outer end of which a cleat 15 is rigidly secured. The cleat 15 is substantially of the same conformation as the recesses 11 and 12, consisting of an elongated portion 15 and an overlapping transverse portion 115 and the portion 115 is of the same width as the portion 15 so that said cleat will fit in said recesses snugly and fill them, as shown in Fig. 2, and will make the peripheral surface of the wheel smooth and flush. A spring 16 holds the cleat in said recesses, it surrounding the rod 14 and pressing against the boss on the bearing bracket 13 at one end and at the other end against a washer 17. When cleats are desired, the rod 14 is pushed outward and turned 90° to the position shown in Fig. 2, which will cause the elongated cleat to extend cross wise of the rim of the wheel, as shown in Fig. 4, and project radially outward beyond the periphery of the wheel or rim. Then the thickened portion 115 of the cleat will bear against the outer surface of the bearing bracket 13 and it will be prevented from turning by the thickened portion 115 of the cleat fitting longitudinally in the outer recess 15. This will provide a cleat extending across the rim and yet when no cleats are desired, the same may be turned and socketed as shown in Fig. 1, and make a smooth wheel.

The ends of the bearing brackets 13 are provided with vent holes 18 to permit the mud to pass up through the same from the unoccupied ends of the recess 11 when the cleat is in the outward and transverse position, as shown in Figs. 2 and 4. When the cleat is socketed it closes the openings 18.

In the modified form shown in Figs. 5, 6 and 7, the cleat 20 is radially movable like the former rod and cleat, but it consists of a simple plate radially adjustable in the wheel rim so that when in its inner position, it will lie flush with the outer surface of the wheel rim and when in its outer position it will project beyond the wheel rim. This plate-like cleat has two holes 21 through it, one not far from the middle and one between the middle hole and the inner edge of the cleat so as to receive a holding pin 22 which is insertible through a couple of bearing brackets 23 secured to the inner surface of the wheel rim at each side of a transverse slot 24 in the wheel rim through which the cleat operates.

When the cleat is in use, the parts are as shown in Fig. 6, the pin 22 extending through the inner hole 21. When the cleat is not needed, the pin 22 is removed, and the cleat pushed in and the pin inserted through the other hole 21, as in Fig. 5, and then the outer end of the cleat will be flush with the outer surface of the wheel rim, and absolutely close the slot or opening.

We claim as our invention:

1. A tractor wheel having a rim provided with an elongated recess therein, a cleat adapted to fit in said recess and mounted in connection with the wheel rim so that it may have radial and rotary adjustment, and yielding means tending to force said cleat radially inward and permitting said adjustment so that when the cleat is turned in one position it will lie in said recess and when turned in another position it will extend across and beyond said recess and wheel rim.

2. A tractor wheel having a rim provided with an opening therein, a rotatable rod radially movable therethrough, a cleat on the outer end of said rod adapted to fit in said opening, and a spring tending to force said rod and cleat inward, whereby when the cleat is turned to one position, it will lie in said opening and when turned to another position, it will project beyond the wheel rim.

3. A tractor wheel having a rim provided with transverse and longitudinal recesses in the periphery thereof, one of said recesses being deeper than the other, a rod extending through the rim, a cleat on the outer end of the rod and adapted to fit in either of said recesses and having a thickness in excess of the depth of one of said recesses, and a spring for forcing said rod and cleat inward, whereby when the cleat is in one position, it will embed itself in the deeper recess and when in the other position, it will partially embed itself in the recess and partially project beyond the wheel rim.

4. A tractor wheel having a rim provided with an opening, a bearing bracket on the inner surface of said rim, a rotatable rod radially movable in said bearing bracket, a cleat on the outer end of said rod having substantially the same conformation and dimensions as the opening, and a spring tending to force said rod inward, so that when turned in one position the cleat will be held embedded in the opening and in another position of the rod the cleat will project beyond the periphery of the wheel.

5. A tractor wheel having a rim, an inwardly extending bearing bracket in connection therewith, said rim and bearing bracket having an external opening therein with an elongated portion circumferential of the rim and a deeper transverse portion extending laterally beyond the longitudinal portion and having the same width as the longitudinal portion, a cleat having the same dimensions as said opening with a transverse portion thicker than the longitudinal portion, a spring held means rotatable in said bearing bracket on which said cleat is secured so that when the cleat is in one position it will be embedded in said opening and when turned 90° therefrom the thicker portion will rest in the outer longitudinal opening and the cleat will project beyond the periphery of the wheel.

6. A tractor wheel having a rim, an inwardly extending bearing bracket in connection therewith, said rim and bearing bracket having an external opening therein with an elongated portion circumferential of the rim and a deeper transverse portion extending laterally beyond the longitudinal portion and having the same width as the longitudinal portion, a cleat having the same dimensions as said opening with a transverse portion thicker than the longitudinal portion, a rod extending radially through said bearing bracket on the outer end of which said cleat is secured, a stop on the inner end of the rod, and a spring coiled about said rod lying between said stop and bearing bracket and tending to force said rod and cleat inward.

In witness whereof, we have hereunto affixed our signatures in the presence of the witnesses herein named.

FRANK I. REMY.
BENJAMIN P. REMY.
ARTHUR BERGER.

Witnesses:
H. B. POLAND,
RUTH I. MILLER.

Copies of this patent may be obtained for five cents each, by addressing the "Commissioner of Patents, Washington, D. C."